United States Patent [19]

Suzuki

[11] Patent Number: 4,658,777

[45] Date of Patent: Apr. 21, 1987

[54] BALANCER STRUCTURE FOR THREE-CYLINDER ENGINES

[75] Inventor: Tsunehiko Suzuki, Tokyo, Japan

[73] Assignee: Fuji Jukogyo Kabushiki Kaisha, Tokyo, Japan

[21] Appl. No.: 795,708

[22] Filed: Nov. 6, 1985

Related U.S. Application Data

[63] Continuation of Ser. No. 412,658, Aug. 30, 1982, abandoned.

[30] Foreign Application Priority Data

Aug. 31, 1981 [JP] Japan ................. 56-136893

[51] Int. Cl.⁴ ............................................. F02B 75/06
[52] U.S. Cl. ................................... 123/192 B; 74/603
[58] Field of Search ....................... 123/192 B, 192 R; 74/603, 604

[56] References Cited

U.S. PATENT DOCUMENTS

| | | | |
|---|---|---|---|
| 1,898,459 | 2/1933 | Newcomb | 123/192 B |
| 2,407,102 | 9/1946 | Ryder | 74/604 |
| 3,402,707 | 9/1968 | Heron | 74/604 |
| 3,760,694 | 9/1973 | Lieb | 123/192 R |
| 4,174,698 | 11/1979 | Dupin | 123/192 B |
| 4,195,613 | 4/1980 | Bratt et al. | 123/192 B |

FOREIGN PATENT DOCUMENTS

| | | | |
|---|---|---|---|
| 0046139 | 4/1981 | Japan | 123/192 B |
| 226530 | 7/1943 | Switzerland | 123/192 B |
| 844071 | 11/1960 | United Kingdom | 123/192 B |
| 1210245 | 10/1970 | United Kingdom | 123/192 B |

Primary Examiner—Craig R. Feinberg
Assistant Examiner—David A. Okonsky
Attorney, Agent, or Firm—Martin A. Farber

[57] ABSTRACT

A balancer structure for a three-cylinder engine for eliminating the vibration in the engine especially the vibration caused by an inertia couple about an axis perpendicular to the crankshaft of the engine. A countershaft is rotated at the same speed as the crankshaft but in opposite direction. Two counterweights are secured to the crankshaft corresponding to the first and third cylinders of both ends for balancing of reciprocating masses and rotating masses. A counterweight is secured to the crankshaft for balancing of rotating masses. At least two balancers are secured to the countershaft at both ends thereof.

16 Claims, 14 Drawing Figures

BALANCER STRUCTURE FOR THREE-CYLINDER ENGINES

CROSS REFERENCE TO RELATED APPLICATIONS

This application is a continuation of application Ser. No. 412,658 filed Aug. 30, 1982 and now abandoned.

BACKGROUND OF THE INVENTION

The present invention relates to a balancer structure for three-cylinder engines, and more particularly to a device provided with a countershaft rotated at the same speed but in the opposite direction of the crankshaft of the engine so as to balance the primary couple of inertia forces of the crankshaft about an intermediate position in the axial direction.

There are two inertia forces of reciprocating masses and rotating masses, causing vibrations in the engine. The inertia forces of rotating masses may be balanced by providing a counterweight on the crankshaft in the opposite direction to a crank arm. The inertia forces of reciprocating masses may be balanced by the counterweight by a half of the inertia forces and the remainder may be balanced by the countershaft which is rotated in the opposite direction from the crankshaft and at the same speed.

However, in the three-cylinder engine, the inertia forces of the first cylinder and the third cylinder act on the crankshaft symmetrically about an intermediate point corresponding to the second cylinder which is disposed between the first and third cylinders. Thus, an inertia couple acts about the intermediate point on the crankshaft. The couple of inertia causes a considerable vibration in the engine. Even if the inertia forces of rotating masses and reciprocating masses are balanced and further if the couple of inertia about the X-axis is balanced, the couple of inertia about an axis perpendicular to the crankshaft is inevitably generated. In order to balance such a couple of inertia, Japanese patent application laid open 55-6035 provides a balancer device of counterweights having a separated structure. Japanese patent publication 54-2333 discloses a countershaft which generates a couple of inertia equal to the couple of inertia of the crankshaft but opposite to the direction thereof.

SUMMARY OF THE INVENTION

The object of the present invention is to provide a balancer device which can balance the couple of inertia about an axis perpendicular to the crankshaft of an engine in addition to the inertia forces of reciprocating masses and rotating masses.

According to the present invention there is provided a balancer structure for a three-cylinder engine having three cylinders, a crankshaft and a countershaft rotated at the same speed as the crankshaft but in opposite direction, comprising: counterweights securely mounted on the crankshaft corresponding to the first and third cylinders disposed in both ends of the engine; a counterweight being disposed on the crankshaft corresponding to the second cylinder disposed at an intermediate position; two balancers securely mounted on the countershaft at both ends thereof.

The present invention will be more apparent from the following description made with reference to the accompanying drawings.

DETAILED DESCRIPTION OF THE PREFERRED EMBODIMENTS

Figures 1, 2:
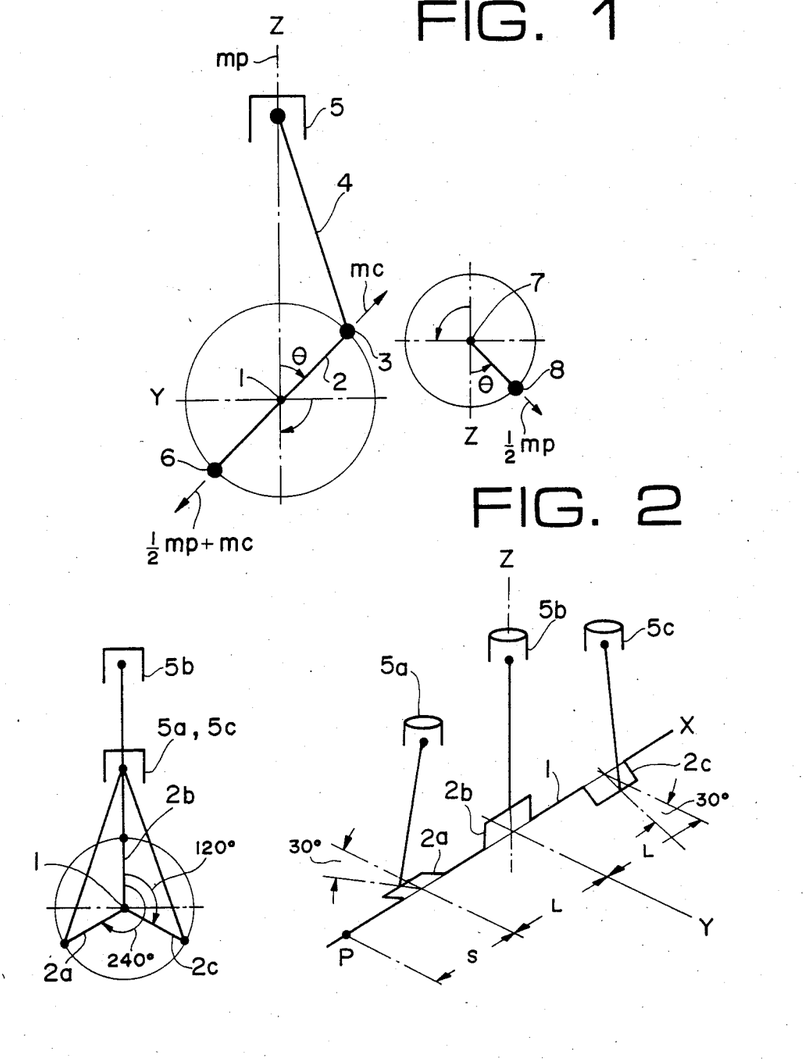
FIGS. 1 to 6 are illustrations for explaining a principle of the present invention.

Explaining a balancing system for one cylinder with reference to FIG. 1, a crankshaft 1 has three crank arms 2 angularly equidistant by 120° with respect to each other. A connecting rod 4 is connected to each crank arm 2 by a crankpin 3 and to a piston 5. A counterweight 6 is secured to the crankshaft 1 along a line extending from the crank arm and at the opposite side of the arm for the balancing of the entire inertia forces of rotating masses and a half of inertia forces of reciprocating masses. A countershaft 7 is rotatably mounted in parallel with the crankshaft 1 and is adapted to be rotated at the same speed as but opposite direction relative to the crankshaft. A balancer 8 is secured to the countershaft 7 for the balancing of the remainder of the inertia forces of the reciprocating masses. The balancer 8 is so disposed that turning angle $\theta$ of the balancer from the bottom on the Z-axis of the countershaft 7 is equal to crank angle $\theta$ from the top dead center.

Presenting the inertial mass of reciprocating parts mp and, for the convenience of explanation, the equivalent inertial mass at the crankpin 3 of rotating parts mc, the mass of the counterweight 6 necessary for eliminating the vibration of the engine unit of FIG. 1 is mp/2+mc, because the mass of the counterweight 6 for balancing one half of the reciprocating inertial mass mp is mp/2 and the mass for balancing the entire rotating mass mc is mc. On the other hand, the mass of the balancer 8 necessary for balancing the remainder of the reciprocating mass is mp/2. Thus, the engine of FIG. 1 is balanced by the counterweight 6 and the balancer 8 having the above described respective masses. Therefore, the total mass of the counterweight 6 of a three-cylinder engine is 3 ((mp/2)+mc) and the total mass of the balancer is (3/2) mp.

Explaining the balancing of the reciprocating inertial mass of the three-cylinder engine with reference to FIG. 2, each of the first cylinder to the third cylinder is designated by a numeral with suffix (a to c). In FIG. 2, the piston 5b of the second cylinder is at the top dead center, the piston 5a of the first cylinder is at 240° crank angle and the piston 5c of the third cylinder is at 120° crank angle. Vibration forces FP1 to FP3 of all cylinders at crank angle $\theta$ are as follows, where r is the radius from the center of the crankshaft to the crankpin and $\omega$ is the angular velocity of the crankshaft.

$$FP1 = mpr\omega^2 \cos(\theta + 240°)$$

$$FP2 = mpr\omega^2 \cos\theta$$

$$FP3 = mpr\omega^2 \cos(\theta + 120°)$$

The total inertia force is $$FP1 + FP2 + FP3 = 0$$

Therefore the vibration forces are balanced.

The couple of inertia of the crankshaft is expressed as $$FP1 \cdot S + FP2(S+L) + FP3(S+2L).$$

where S is a distance of a point P on the X-axis from the first cylinder, L is a pitch between adjacent cylinders. The above formula is substituted as follows.

$$FP1(S) + FP2(S+L) + FP3(S+2L) = \sqrt{3}mpr\omega^2 L \sin\theta \quad (1)$$

Thus, the couple of inertia about the Y-axis is produced in the crankshaft by reciprocating masses in the Z-axis direction.

Figure 3:
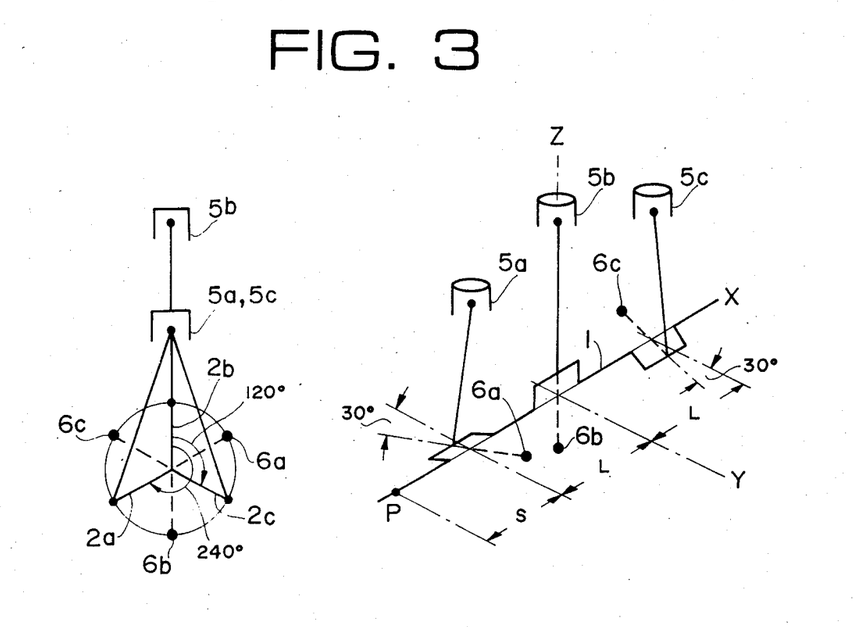

Explaining the half balancing of the inertia forces of the reciprocating masses by counterweights $6a$, $6b$ and $6c$ with reference to FIG. 3, pistons $5a$–$5c$ are in the same positions as FIG. 2 and each of counterweights $6a$, $6b$ and $6c$ is positioned at an angular position advanced $180°$ from the corresponding crank arm $2a$–$2c$.

Forces Frec1 to Frec3 caused by the mass of each counterweight in the Z-axis direction at a crank angle $\theta$ are as follows.

$$Frec1 = (mp/2)r\omega^2 \cos(\theta + 240° - 180°)$$

$$Frec2 = (mp/2)r\omega^2 \cos(\theta + 180°)$$

$$Frec3 = (mp/2)r\omega^2 \cos(\theta + 120° + 180°)$$

Therefore, inertia forces in the Z-axis direction are $$Frec1 + Frec2 + Frec3 = 0$$

Thus, the inertia forces are balanced.

The couple of inertia caused by the inertia forces in the Z-axis about the Y-axis is expressed as $$Frec1(S) + Frec2(S+L) + Frec3(S+2L) = (\sqrt{3}/2)mpr\omega^2 L \sin\theta \quad (2a)$$

Accordingly, couple of inertia about the Y-axis is also produced by masses of the counterweights $6a$–$6c$.

In addition, each of inertia forces of the counterweights $6a$–$6c$ has also a component in the Y-axis direction. The couple of inertia about the Z-axis is $$-(\sqrt{3}/2)mpr\omega^2 L \cos\theta \quad (2b)$$

Thus, the counterweights $6a$–$6c$ produce the couple of inertia about the Y-axis and the couple of inertia about the Z-axis. The composite couple of inertia is presented as $$(3/2)mpr\omega^2 L \sin\theta - (\sqrt{3}/2)mpr\omega^2 L \cos\theta = (\sqrt{3}/2)mpr\omega L(\sin\theta = \cos\theta) \quad (3)$$

It is to be noted that it is possible to remove a counterweight for the second cylinder and the counterweight is distributed to the first and third cylinders. Explaining this with reference to FIG. 4, masses of counterweights $6a'$ and $6c'$ of first and third cylinders are $(\sqrt{3}/2)(mp/2)$. The counterweight $6a'$ of the first cylinder is positioned in advance $180° + 30°$ from the crank arm $2a$ and the counterweight $6c'$ of the third cylinder is positioned in advance $180° - 30°$ from the crank arm $2c$. That is counterweights $6a'$ and $6c'$ are $180°$ opposed and make a right angle with the crank arm $2b$.

Figure 4:
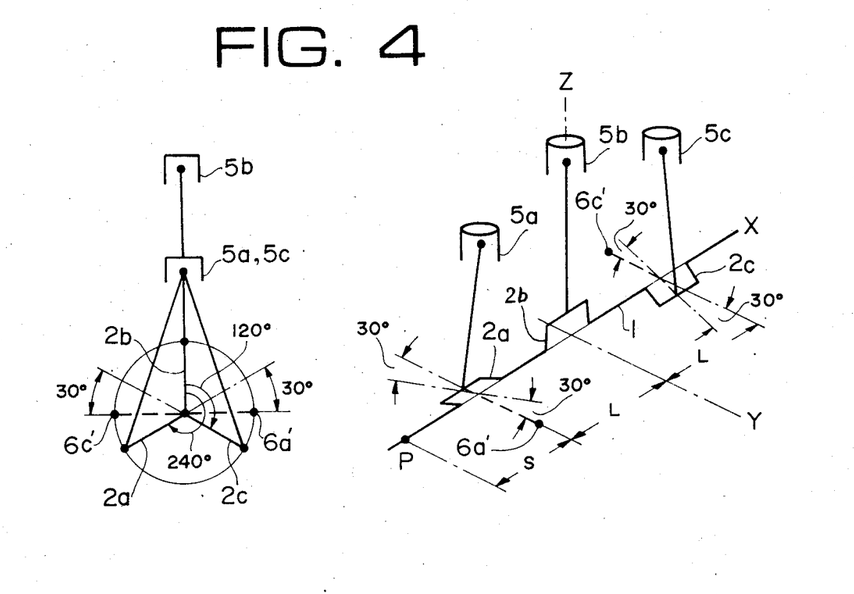

The inertia forces of each cylinder by the counterweight in the Z-axis direction at a crank angle $\theta$ is as follows.

$$Frec1' = (\sqrt{3}/2)(mp/2)r\omega^2 \cos(\theta + 240° + 180° + 30°)$$

$$Frec3' = (\sqrt{3}/2)(mp/2)r\omega^2 \cos(\theta + 120° + 180° - 30°)$$

The inertia forces in the A-axis direction are $$Frec1' + Frec3' = 0$$

Thus, the inertia forces are balanced.

The couple of inertia by the Z-axis forces about the Y-axis is $$Frec1' \cdot S + Frec3'(S+2L) = (\sqrt{3}/2)mpr\omega^2 L \sin\theta$$

This formula is the same as the formula (2a). The couple of inertia about the Z-axis is also the same as the formula (2b).

Thus, it will be understood that the inertia forces can be balanced by providing counterweights for all cylinders or for the first and third cylinders and that the couple of inertia in both cases are the same.

The balancing of the couple of inertia about the Y-axis and Z-axis will be explained hereinafter. The composite couple of inertia of formulas (1) and (3) is $$-\sqrt{3}mpr\omega^2 L \sin\theta + (\sqrt{3}/2)mpr\omega^2 L (\sin\theta - \cos\theta) = -(\sqrt{3}/2)mpr\omega^2 L (\sin\theta + \cos\theta) \quad (4)$$

A system for balancing such a couple of inertia by the countershaft will be described hereinafter with reference to FIG. 5. Balancers $8a$, $8b$ and $8c$ balance a half of the inertia forces of reciprocating masses, and hence each mass is $mp/2$. As shown in the figure, the balancer $8b$ for the second cylinder is at the bottom when the piston $5b$ of the second cylinder is at the top dead center, the balancer $8a$ for the first cylinder is at a position advancing $240° - 180°$ from the top in the counterclockwise direction, and the balancer $8c$ for the third cylinder is positioned advancing $120° + 180°$.

Therefore, the inertia forces by the balancers in the Z-axis direction at an angle $\theta$ are as follows.

$$Frec1 = (mp/2)r\omega^2 \cos(\theta + 240° - 180°)$$

$$Frec2 = (mp/2)r\omega^2 \cos(\theta + 180°)$$

$$Frec3 = (mp/2)r\omega^2 \cos(\theta + 120° + 180°)$$

Thus the inertia forces in the Z-axis direction are balanced.

The couple of inertia about the Y-axis by the inertia forces in the Z-axis direction is $$(\sqrt{3}/2)mpr\omega^2 L \sin\theta \quad (2a')$$

The inertia forces in the Y-axis direction are minus since the countershaft rotates in the counterdirection. However, the inertia forces are balanced.

The couple of inertia about the Z-axis by the forces in the Y-axis direction is $$(\sqrt{3}/2)mpr\omega^2 L \cos\theta \quad (2b')$$

The composite couple of inertia of formulas (2a') and (2b') is $$(\sqrt{3}/2)mpr\omega^2 L (\sin\theta + \cos\theta) \quad (4')$$

If the formula (4') and the formula (4) are combined, $$(\sqrt{3}/2)mpr\omega^2 L\ (\sin\theta+\cos\theta)-(\sqrt{3}/2)mpr\omega^2 L\ (\sin\theta+\cos\theta)=0$$

Thus, couples of inertias about an axis perpendicular to the crankshaft may be balanced by balancers on the countershaft.

Figure 5:
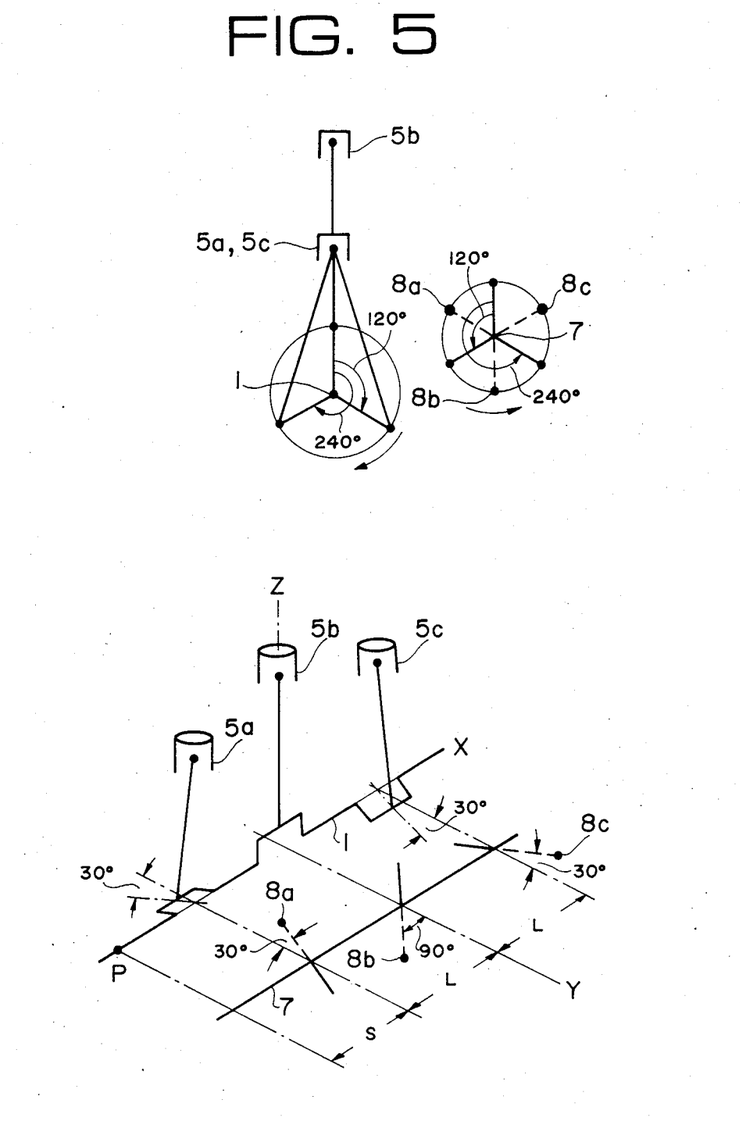
Figure 6:
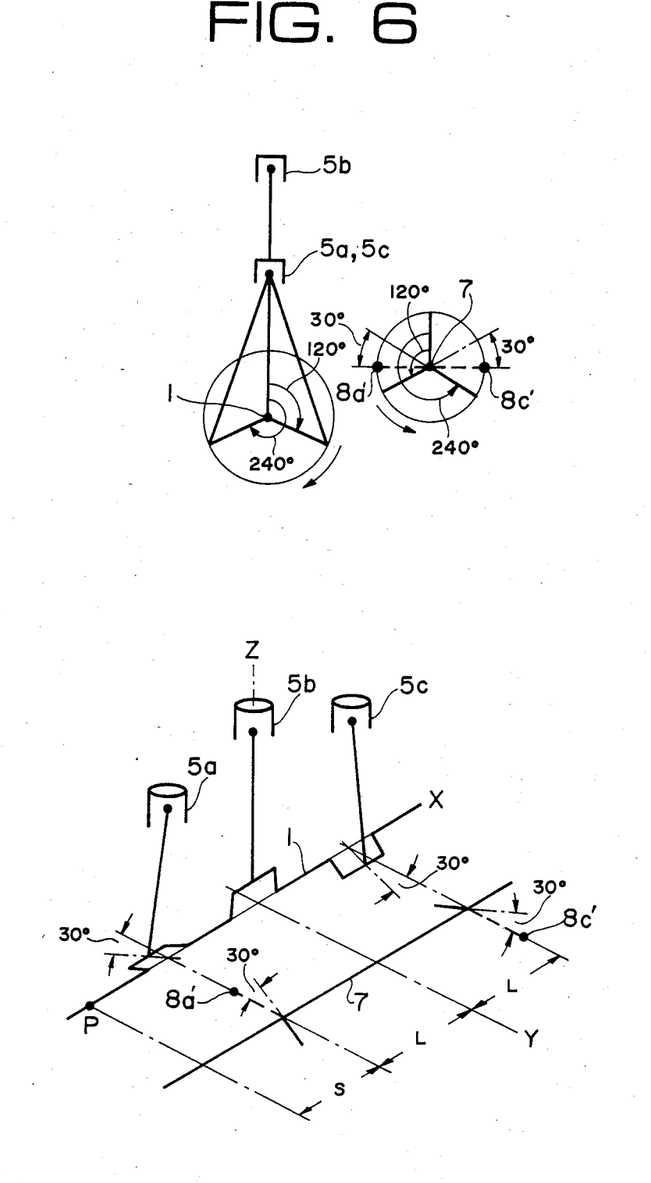

FIG. 6 shows an example in which the balancer for the second cylinder is omitted like FIG. 4. The mass of the balancer $8a'$ for the first cylinder and the mass of the balancer $8c'$ and for the third cylinder is $(mp/2)(\sqrt{3}/2)$ respectively. The balancer $8a'$ is advanced 30° from the position of FIG. 5 and the balancer $8c'$ is retarded 30°. By these conditions, inertia forces of reciprocating masses are balanced.

The balancing of the forces by rotating parts will be explained hereinafter. The construction of the balancer device is the same as FIG. 2. Forces Fc1, Fc2, Fc3 in the first to third cylinders at a crank angle $\theta$ are $$Fc1=mcr\omega^2 \cos(\theta+240°)$$

$$Fc2=mcr\omega^2 \cos\theta$$

$$Fc3=mcr\omega^2 \cos(\theta+120°)$$

The couple of inertia about the Y-axis by the rotating masses is $$-\sqrt{3}mcr\omega^2 L \sin\theta \tag{5a}$$

The couple of inertia about the Z-axis is $$\sqrt{3}mcr\omega^2 L \cos\theta \tag{5b}$$

The composite couple of inertia is $$-\sqrt{3}mcr\omega^2 L (\sin\theta-\cos\theta) \tag{6}$$

The balancing system with the counterweights 6a, 6b, 6c for the couple of inertia by the rotating masses are described hereinafter. The construction of the system is the same as FIG. 3. Forces Frot1, Frot2 and Frot3 by masses of counterweights 6a to 6c are $$Frot1=mcr\omega^2 \cos(\theta+240°-180°)$$

$$Frot2=mcr\omega^2 \cos(\theta+180°)$$

$$Frot3=mcr\omega^2 \cos(\theta+120°+180°)$$

The couple of inertia about the Y-axis is $$\sqrt{3}mcr\omega^2 L \sin\theta \tag{7a}$$

The couple of inertia about the Z-axis is $$\sqrt{3}mcr\omega^2 L \cos\theta \tag{7b}$$

The composite couple of inertia is $$\sqrt{3}mcr\omega^2 L (\sin\theta-\cos\theta) \tag{8}$$

Thus, the composite couple of inertia of the formula (6) is also balanced by the composite couple of inertia of the formula (8).

The forces of rotating masses may also be balanced by separating counterweights into the first and third cylinders as described with respect to FIG. 4. The mass of the counterweight is $mc(\sqrt{3}/2)$ and the phase of the counterweight is advanced or retarded by 30°.

The present invention is based on the above described principle. In accordance with the present invention, inertia forces and couple of inertia caused by rotating masses are balanced by counterweights mounted on the crankshaft and vibration caused by reciprocating masses is eliminated by counterweights on the crankshaft and balancers on the countershaft.

Figure 7:
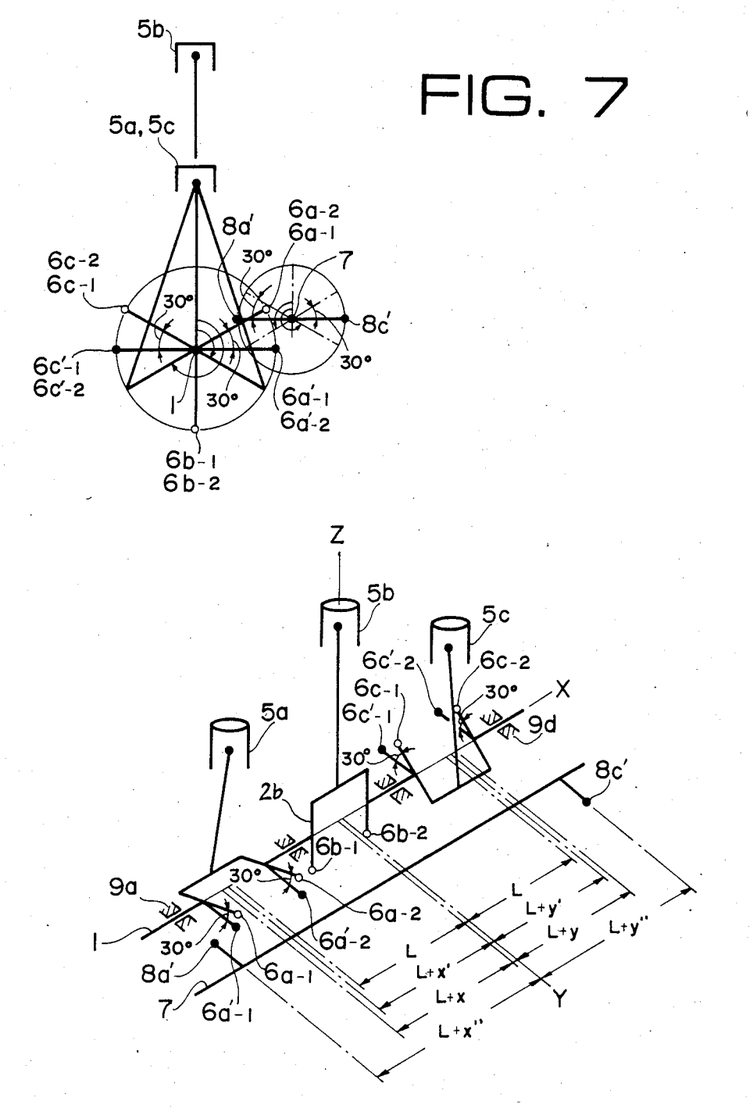
FIG. 7 shows an embodiment of the present invention.

Referring to FIG. 7, counterweights $6a$-1, $6a$-2, $6b$-1, $6b$-2, $6c$-1, and $6c$-2 are provided for each cylinder opposite to the crankarm like FIG. 3 for balancing the rotating masses. Further, for the first cylinder, two counterweights $6a'$-1 and $6a'$-2 are provided and counterweights $6c'$-1 and $6c'$-2 are provided for the third cylinder for balancing reciprocating masses.

The countershaft 7 is provided with balancers $8a'$ and $8c'$ at positions corresponding to bearings $9a$ and $9d$ of both ends except the second cylinder. Since counterweights $6a'$-1, $6a'$-2, $6c'$-1 and $6c'$-2 for the reciprocating masses are separated into two positions, each counterweight is $(mp/2)(\sqrt{3}/2)$ and the phase of each counterweight is advanced or retarded by 30° whereby they make right angles with the crank arm $2b$ (see description with respect to FIG. 4). If the pitch between the cylinders is L, the couple of inertia is balanced by the following conditions.

$$(mp/2)(\sqrt{3}/2)2L=(\sqrt{3}/2)mpL$$

Therefore, presenting the composite mass of the counterweights $6a'$-1 and $6a'$-2 "Mca'", and the composite mass of the counterweights $6c'$-1 and $6c'$-2 "Mcc'", for the balancing of the inertia forces on the crankshaft 1, it is necessary to keep Mca'=Mcc'.

Further, presenting the position of the composite center of gravity of the counterweights $6a'$-1 and $6a'$-2 in respect to the Y-axis "L+X'", and the position of the composite center of the gravity of the counterweights $6c'$-1 and $6c'$-2 "L+Y'", it is necessary to satisfy the following equation $$Mca'(L+X'+L+Y')=(\sqrt{3}/2)mpL$$

Hence, $$Mca'=Mcc'=(\sqrt{3}/2)mpL/(2L+X'+Y') \tag{9a}$$

As to the counterweights $6a$-1, $6a$-2, $6b$-1, $6b$-2, and $6c$-1, $6c$-2 for balancing the mass of the rotating parts, it is necessary to keep Mca=Mcb=Mcc, where Mca, Mcb and Mcc are composite mass respectively. If the position of the composite center of the gravity of counterweights $6a$-1 and $6a$-2 for the composite center of the gravity of counterweights $6b$-1 and $6b$-2 is L+X and the composite center of gravity of counterweights $6c$-1 and $6c$-2 for the composite center of the gravity of counterweights $6b$-1 and $6b$-2 is L+Y, $$Mca(L+X)=Mcc(L+Y)$$

Thus, X=Y is necessary. For the couple of inertia in the Y-axis direction, it is necessary to satisfy $$((Mca(L+X)+Mcc(L+Y))\cos 30°=\sqrt{3}mcL$$

This is changed to the following general formula.

$$Mca=Mcb=Mcc=mcL/(L+X) \tag{9b}$$

Thus, the mass of the counterweight may be suitably determined in dependency on the composite center of the gravity. The mass decreases with the increase of $X'$, $Y'$, $X$ and $Y$. If the center of gravity of the first cylinder coincides with that of the third cylinder and the center of gravity of the second cylinder is positioned at the center of gravity, $X'=Y'=X=Y=0$. Therefore, the mass of the counterweight of the first and third cylinder is $(\sqrt{3}/4)$ mp respectively. And the mass of the counterweight of the second cylinder is mc. It will be noted that although counterweights 6a-1 and 6a'-1 and others are separated by an angle of 30°, in practice these counterweights are integrally combined.

The masses of the balancers on the countershaft 7, as described above, correspond to the masses of the reciprocating parts of the engine and each mass is (mp/2)($\sqrt{3}/2$) and its phase is adjusted by 30°. The massess are so arranged as to produce the following couple of inertia, $$(mp/2)(\sqrt{3}/2)2L = (\sqrt{3}/2)mpL$$

Therefore, considering the balancing of the inertia forces on the countershaft, it is necessary to keep Mba'=Mbc', where Mba' is the mass of the balancer 8a' and Mbc' is the mass of the balancer 8c'. If the positions of the centers of gravities of the balancers 8a' and 8c' are $L+X''$ and $L+Y''$, the following conditions are necessary:

$$Mba'(L+X''+L+Y'') = (\sqrt{3}/2)mpL$$

As a result, $$Mba' = Mbc' = (\sqrt{3}/2)mpL/(2L+X''+Y'') \quad (10)$$

Thus, the masses Mba' and Mbc' also decrease with the increase of $X''$ and $Y''$. Accordingly, the device may be made in a small size.

As is understood from the foregoing, the masses of the counterweights 6a'-1, 6a'-2, and 6c'-1, 6c'-2 are provided to satisfy the equation (9a) and positioned to make a right angle with the crank arm 2b of the second cylinder. Counterweights 6a-1, 6a-2, 6b-1, 6b-2, and 6c-1, 6c-2 of formula (9a) are opposite to respective crankpin. On the other hand, the balancers 8a' and 8c' of the formula (10) are positioned, corresponding to the bearings 9a and 9d. The balancers 8a' and 8c' are so disposed that when the piston of the second cylinder is at the top dead center, the balancer 8a' is at the same angular position as the counterweights 6c'-1 and 6c'-2 and the balancer 8c' is at the same angular position as the counterweights 6a'-1 and 6a'-2. Thus, the primary inertia forces, primary couple of inertia of the reciprocating and rotating parts of a three-cylinder engine and the primary couple of inertia of the crankshaft about axes perpendicular to the crankshaft are balanced by the counterweights on the crankshaft and balancers on the countershaft.

Since the balancers 8a' and 8c' are disposed corresponding to the bearings at both ends so as not to engage with the counterweights, the countershaft may be disposed adjacent to the crankshaft. In addition, since the counterweights for the reciprocating masses are provided for the first and third cylinders with the exception of the second cylinder, the engine may be made of a small size compared with an engine provided with counterweights at every cylinders.

Figure 8:
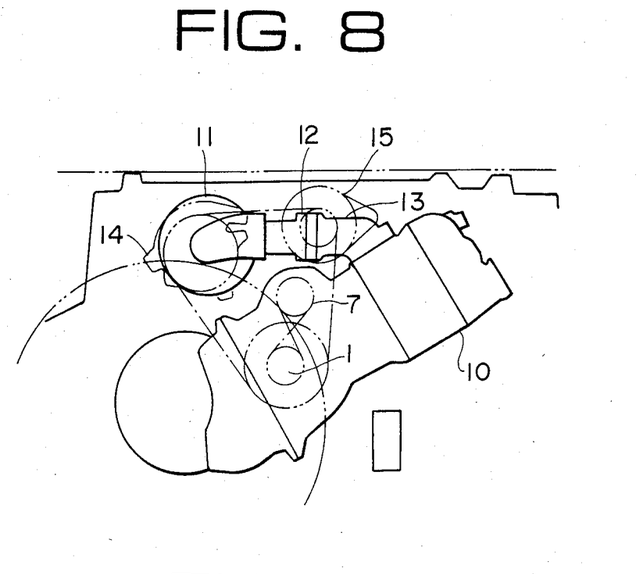
FIGS. 8 and 9 are side views showing examples for automobile engines.

FIG. 8 shows an example in which an engine 10 is transversely mounted on an automobile at a rear portion thereof for driving the rear wheels. An air cleaner 11, carburetor 12 and induction pipe 13 are horizontally disposed and connected with each other. Further, a compressor 14 for an air conditioner and ACG 15 are also attached. In accordance with the present invention, the countershaft 7 can be disposed adjacent to the crankshaft 1 without interfering with upper devices such as the carburetor 12.

Figure 9:
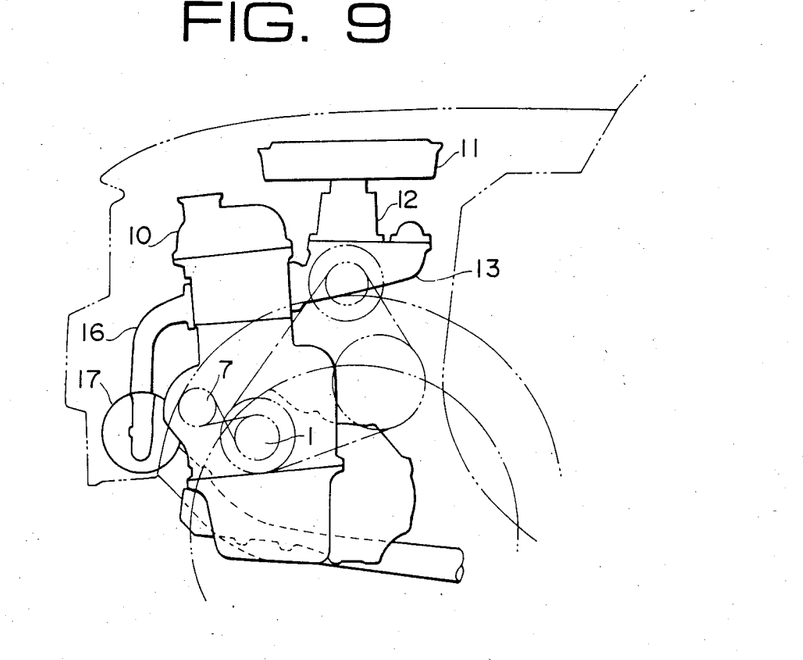

FIG. 8 shows another example in which the engine 10 is transversely mounted on an automobile at a front portion for driving the front wheels. An exhaust pipe 16 and a catalytic converter 17 for an emission control system are disposed in a front side of the engine. In this example, the countershaft 7 can also be disposed adjacent to the crankshaft 1 without interfering with such the equipments.

Figure 10:
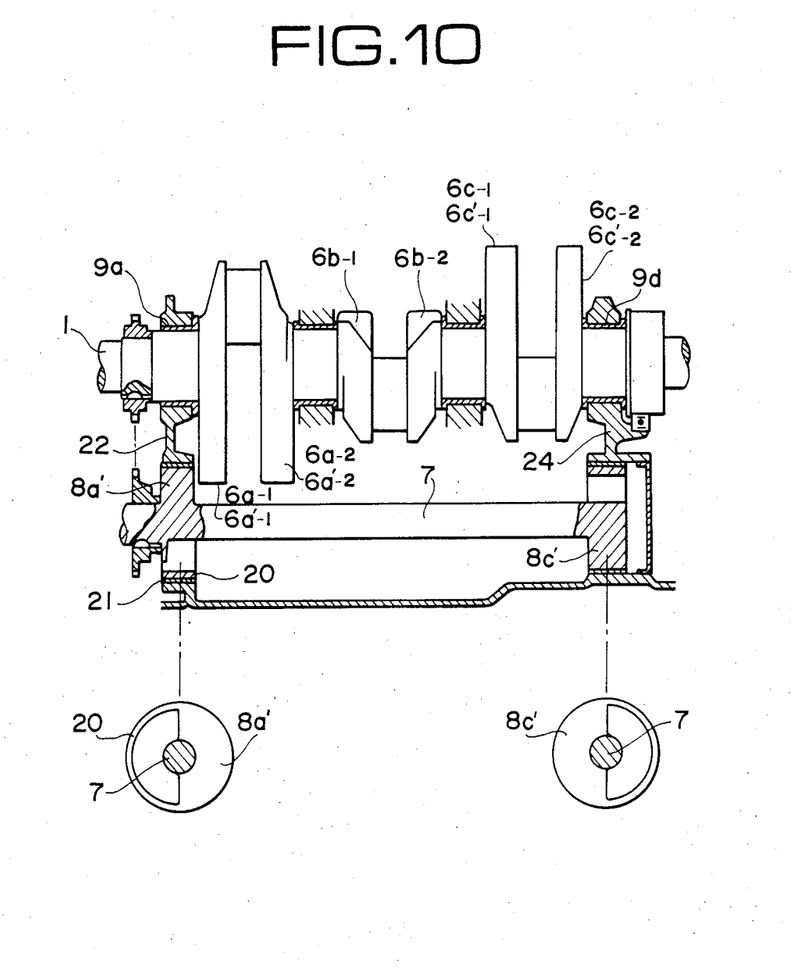
FIGS. 10 to 14 illustrate other embodiments of the present invention, respectively.

Referring to FIG. 10 showing the second embodiment of the present invention, each of balancers 8a' and 8c' of this embodiment is formed as a part of a journal for bearing the countershaft 7. The balancer 8a' is eccentrically formed in a cylindrical journal 20 which is coaxial and integral with the countershaft 7. The journal 20 is supported by a journal bearing 21 in a frame 22 which supports the crankshaft 1 by the bearing 9a. The balancer 8c' is formed in the same manner as the balancer 8a' and supported in a frame 24. Other parts are the same as the first embodiment of FIG. 7.

In accordance with this embodiment, extra portions for bearing the countershaft are not provided, whereby the device may be assembled into a small size.

Figure 11:
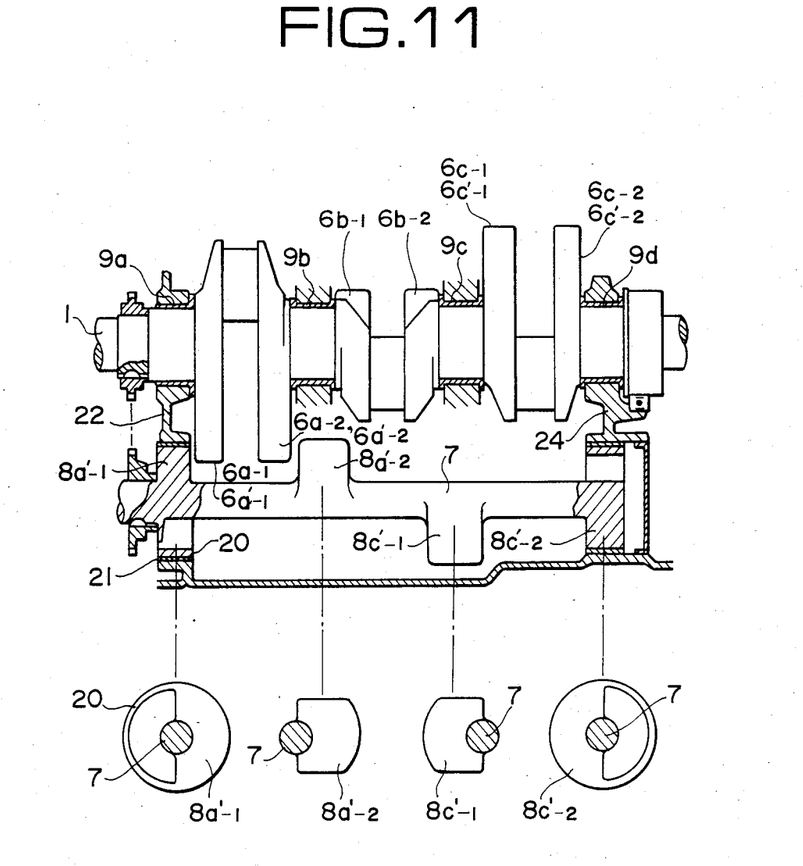

In the third embodiment of FIG. 11, balancer 8a' is divided into balancers 8a'-1 and 8a'-2 and balancer 8c is divided into 8c'-1 and 8c'-2. In this embodiment, composite mass Mba' of the balancers 8a'-1 and 8a'-2 and composite mass Mbc' of the balancers 8c'-1 and 8c'-2 must be equal. Each of balancers 8a'-1 and 8c'-2 at both ends is formed as journal 20 as the second embodiment and supported by the journal bearings 21.

Figure 12:
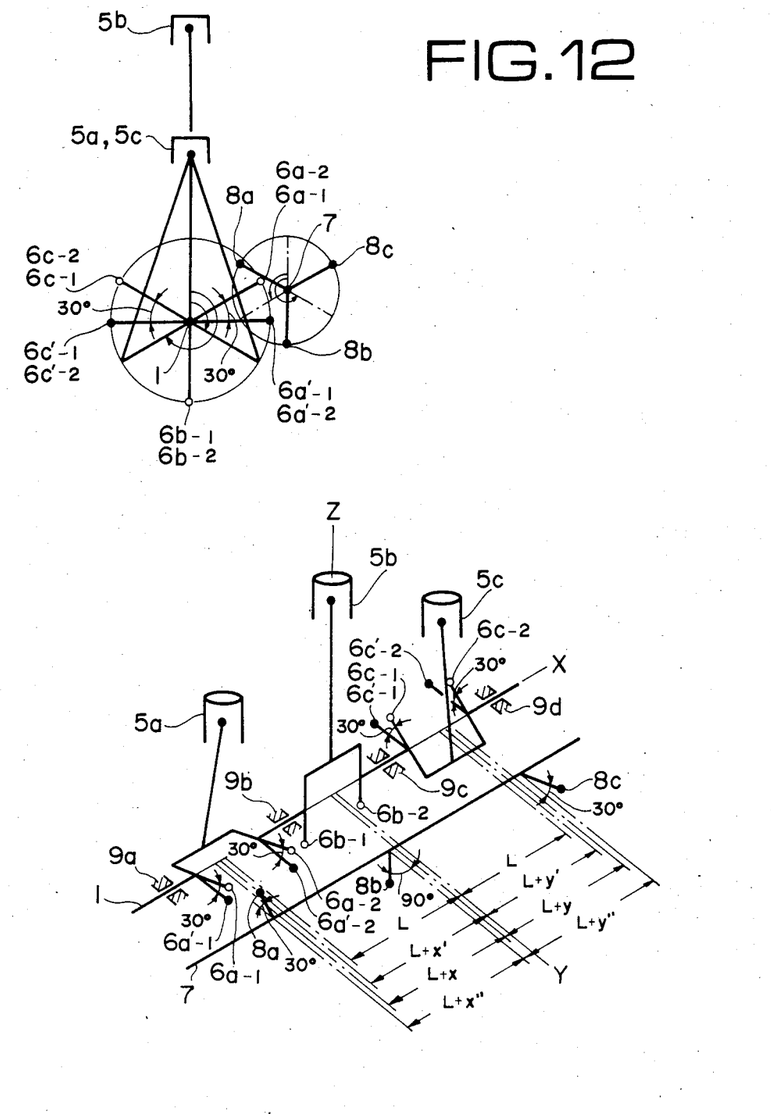

In the fourth embodiment of FIG. 12, the balancer comprises three balancers 8a, 8b and 8c according to the principle of FIG. 5. Also in this embodiment, mass Mba, Mbb and Mbc of balancers 8a, 8b and 8c must be equal each other.

Figure 13:
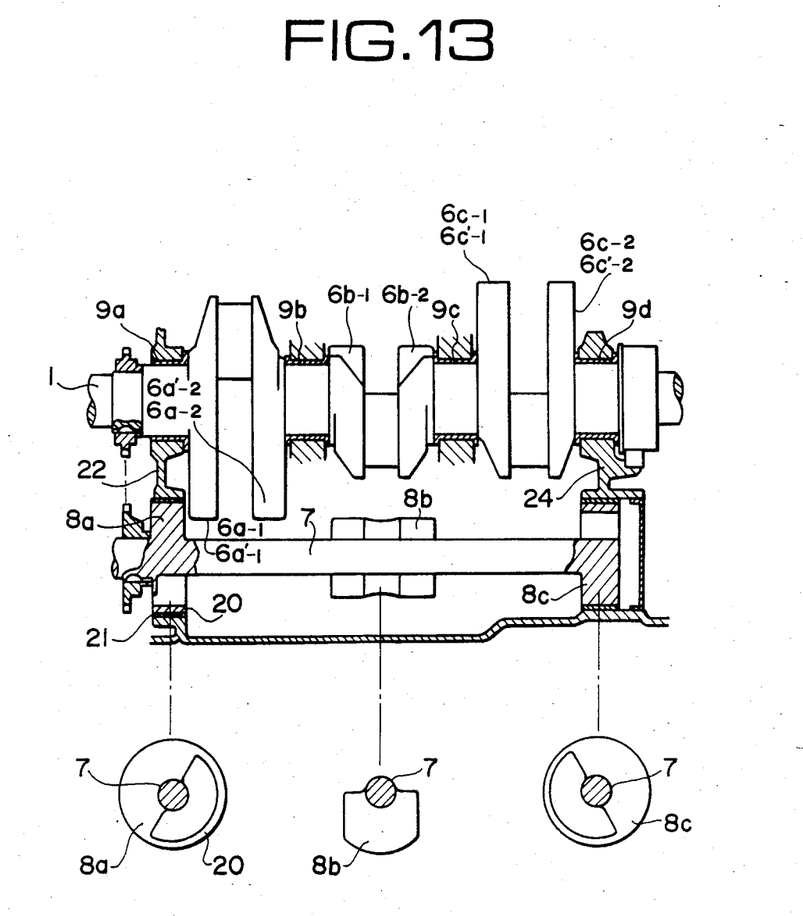

FIG. 13 shows the fifth embodiment of the present invention. In this embodiment, the balancer comprises three balancers 8a, 8b and 8c like the fourth embodiment. Each of balancers 8a and 8c at both ends is formed as journal 20 and the same parts as FIG. 11 are identified by the same numerals.

Figure 14:
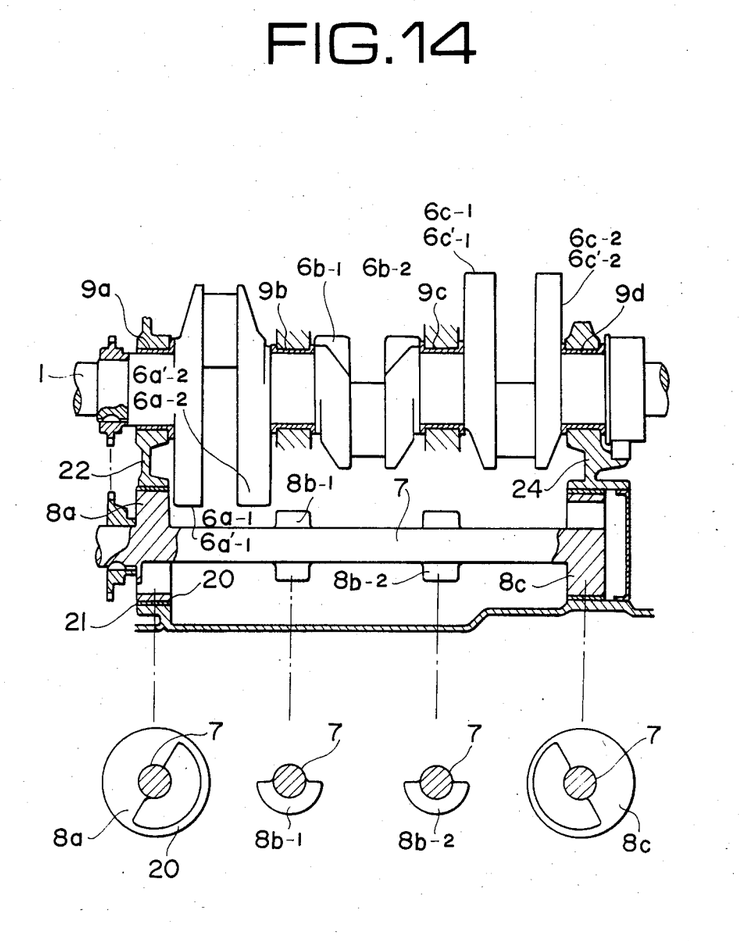

In the sixth embodiment shown in FIG. 14, the central balancer of the fifth embodiment of FIG. 13 is divided into balancers 8b-1 and 8b-2. The center of gravity of the balancers 8b-1 and 8b-2 is positioned at a center of the second cylinder. The balancer 8b-1 corresponds to a bearing 9b for the crankshaft 1 and the balancer 8b-2 corresponds to a bearing 9c. Thus, the space in the engine may be effectively used.

What is claimed is:

1. A balancer structure for a three-cylinder in-line engine having three cylinders, the latter comprising a first and third cylinder and a second cylinder disposed between said first and third cylinders, a crankshaft having crank arms disposed at angles of 120° with respect to each other and operatively connected to a piston assembly within each of said cylinders, respectively, consisting of:

a single crankshaft adjacent and parallel to and rotated at the same speed as the crankshaft but in the opposite direction, means comprising first counterweights securely mounted on said crankshaft only at positions thereof corresponding to the first and third cylinders for balancing of a part of inertia forces of rotating masses and a part of inertia forces of reciprocating masses;

means comprising at least one second counterweight securely mounted on said crankshaft substantially opposite to the crank arm corresponding to the second cylinder for balancing of the remainder of the inertia forces of rotating masses;

at least two balancers respectively securely mounted on said countershaft at both ends respectively thereof for the balancing of the remainder of the inertia forces of reciprocating masses, and of the couple of inertia of the crankshaft about axes perpendicular to the crankshaft.

2. The balancer structure for a three-cylinder engine according to claim 1 wherein each counterweight comprises a pair of weights.

3. The balancer structure according to claim 1, wherein
the cylinders are aligned spaced by equal distance therebetween.

4. The balancer structure according to claim 1, wherein
said first counterweights include third counterweights for the first and third cylinders for the balancing of the reciprocating masses,
the masses of said third counterweights are equal.

5. The balancer structure according to claim 4, wherein
each of said balancers at respective ends of said countershaft are disposed at the same angular position as said third counterweights at remote ends of said crankshaft respectively when said second cylinder is in a top dead center condition.

6. The balancer structure according to claim 1, wherein
said balancers are positioned on said countershaft axially offset with respect to said first counterweights so as not to engage with the first counterweights while crossing axially offset during rotation.

7. The balancer structure according to claim 6, wherein
said countershaft is closely adjacent to said crankshaft.

8. The balancer structure for a three-cylinder engine according to claim 1 wherein said balancers are disposed in positions corresponding to bearings for both ends of said crankshaft.

9. The balancer structure according to claim 8, wherein
said balancers are positioned on said countershaft axially offset with respect to said first counterweights so as not to engage with the first counterweights while crossing axially offset during rotation, said bearings are disposed such that said first counterweights are therebetween.

10. The balancer structure according to claim 9, wherein
said countershaft is closely adjacent to said crankshaft.

11. The balancer structure according to claim 1, wherein
said first counterweights include third counterweights for the first and third cylinders for the balancing of the reciprocating masses,
respective of said third counterweights for the balancing of the reciprocating masses is respectively advanced and retarded by 30° from a position opposite a first and third of said crank arms, respectively, corresponding to said first and third cylinders, such that said third counterweights extend perpendicular to said crank arm corresponding to said second cylinder.

12. The balancer structure according to claim 11, wherein
the cylinders are aligned spaced by equal distance therebetween.

13. The balancer structure according to claim 11, wherein
said third counterweights are each formed in pairs and have composite masses which are equal and disposed at equal distances from a central axis perpendicular to said crankshaft passing through said crank arm corresponding to said second cylinder.

14. The balancer structure according to claim 1, wherein
said first counterweights include third counterweights for the first and third cylinders for the balancing of the reciprocating masses as well as fourth counterweights for the balancing of the rotating masses, said fourth counterweights are separated from a corresponding of said third counterweights by an angle of plus and minus 30°, respectively.

15. The balancer structure according to claim 14, wherein
said fourth counterweights and said third counterweights are at least partially integrally combined.

16. The balancer structure according to claim 15, wherein
said third counterweights form a right angle with respect to the crank arm for the second cylinder, and
said fourth counterweights for said first and third cylinders, respectively, are positioned 180° and with respect to a first and third of said crank arms, respectively, corresponding to said first and third cylinders.

* * * * *